United States Patent [19]

Leo et al.

[11] Patent Number: 4,705,257
[45] Date of Patent: Nov. 10, 1987

[54] SHOCK AND VIBRATION ISOLATION MOUNTING

[75] Inventors: Cosmo L. Leo, Waltham; Stanley W. Stefanick, Uxbridge, both of Mass.

[73] Assignee: Digital Equipment Corporation, Maynard, Mass.

[21] Appl. No.: 29,328

[22] Filed: Mar. 23, 1987

[51] Int. Cl.$^4$ ............................................. F16M 13/00
[52] U.S. Cl. ................................... 248/611; 248/634; 248/638; 248/201; 267/141; 312/236; 312/320
[58] Field of Search ............... 248/560, 580, 581, 603, 248/605, 610, 611, 618, 620, 621, 632, 634, 635, 638, 201, 220.2, 222.1, 224.3, 225.1, 359, 360; 312/236, 320; 267/141, 153

[56]  References Cited

U.S. PATENT DOCUMENTS

| | | | |
|---|---|---|---|
| 1,136,071 | 4/1915 | Weiss | 312/320 |
| 2,386,248 | 10/1945 | Marzetti | 248/635 |
| 2,514,246 | 7/1950 | Knox | 312/320 |
| 2,646,958 | 7/1953 | Coykendall | 248/611 |
| 3,093,367 | 6/1963 | Hawkins | 267/153 |
| 3,204,911 | 9/1965 | Lawrence | 248/611 |
| 3,420,480 | 1/1969 | Matson | 248/222.1 |
| 3,822,049 | 7/1974 | Saunders | 248/225.1 |
| 4,260,208 | 4/1981 | Lun Ho | 248/632 |

FOREIGN PATENT DOCUMENTS

| | | | |
|---|---|---|---|
| 227526 | 3/1960 | Australia | 248/632 |
| 2821493 | 11/1979 | Fed. Rep. of Germany | 248/63 B |
| 2456260 | 1/1981 | France | 267/141 |

*Primary Examiner*—J. Franklin Foss
*Assistant Examiner*—Robert A. Olson
*Attorney, Agent, or Firm*—Hayes, Davis & Soloway

[57]  ABSTRACT

Shock and vibration isolation mounting apparatus for releasably mounting a computer disk drive, or the like. Two pair of mounting assemblies are used for attaching to the drive and to respective ones of opposed surfaces between which the drive is disposed. One of the pair of mounting assemblies is disposed below the drive with the elastomeric members thereof in compression and the other of the pair of mounting assemblies is disposed above the drive with the elastomeric members thereof in tension. Each of the mounting assemblies comprises a first elongated rigid channel member being U-shaped in cross section and comprising a base separating a pair of parallel spaced sides. The first channel member has a transverse member having a bore therethrough at one end perpendicular to both the base and the sides. The first channel member is adapted for attaching to the disk drive. There is a second elongated rigid channel member also being U-shaped in cross section and comprising a base separating a pair of parallel spaced sides. The second channel member has a transverse member having a threaded bore therethrough at one end perpendicular to both the base and the sides. The second channel member is sized to slidably fit within the first channel member. A spring-loaded captive bolt is carried by the transverse member of the first channel member for passing through the bore of the first channel member and threadedly engaging the threaded bore of the second channel member to pull the transverse members towards one another. First and second elastomeric members are carried by the second channel member on the base between the sides at opposite ends thereof. The elastomeric members each include a captive bolt perpendicular to the base thereof for attaching the second channel member to the adjacent surface. The ends of the first and second channel members opposite the transverse members include interactive ends adapted for drawing the ends together and for holding them tightly together as the captive bolt is used to pull the transverse members towards one another comprising the ends of the sides of the first channel member angling at about 45° back towards the base and the ends of the sides of the second channel member including outward facing tabs angling at about 45° back towards the base so as to wedgedly force the bases of the first and second channel members tightly towards one another.

17 Claims, 14 Drawing Figures

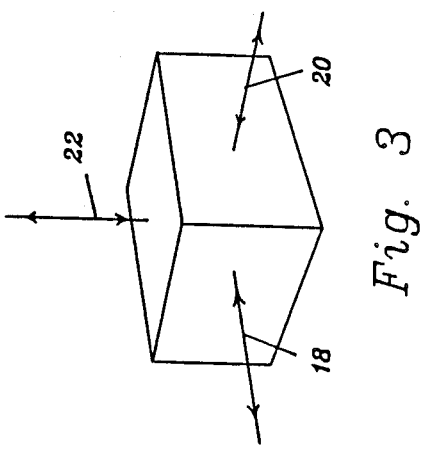
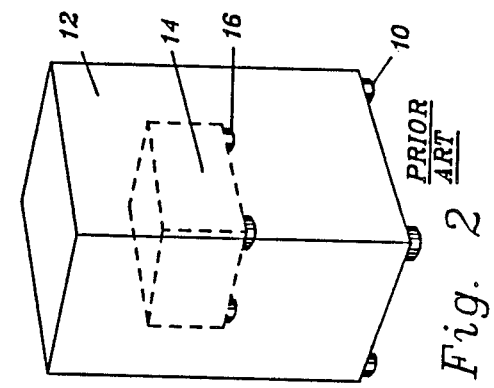
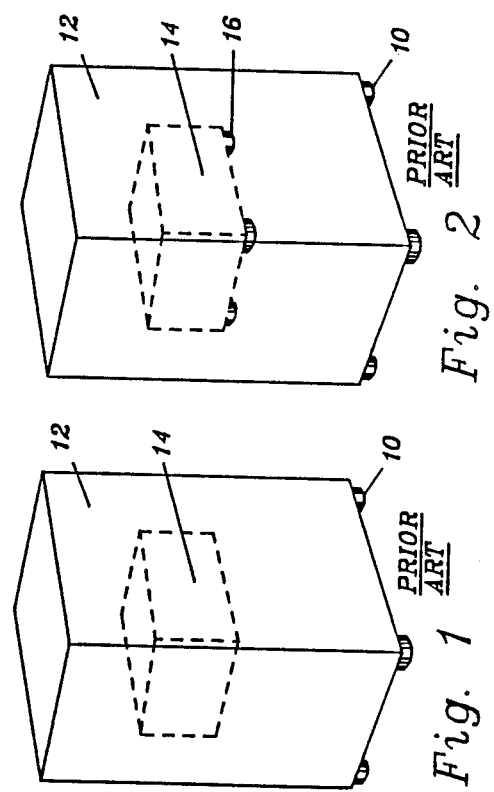
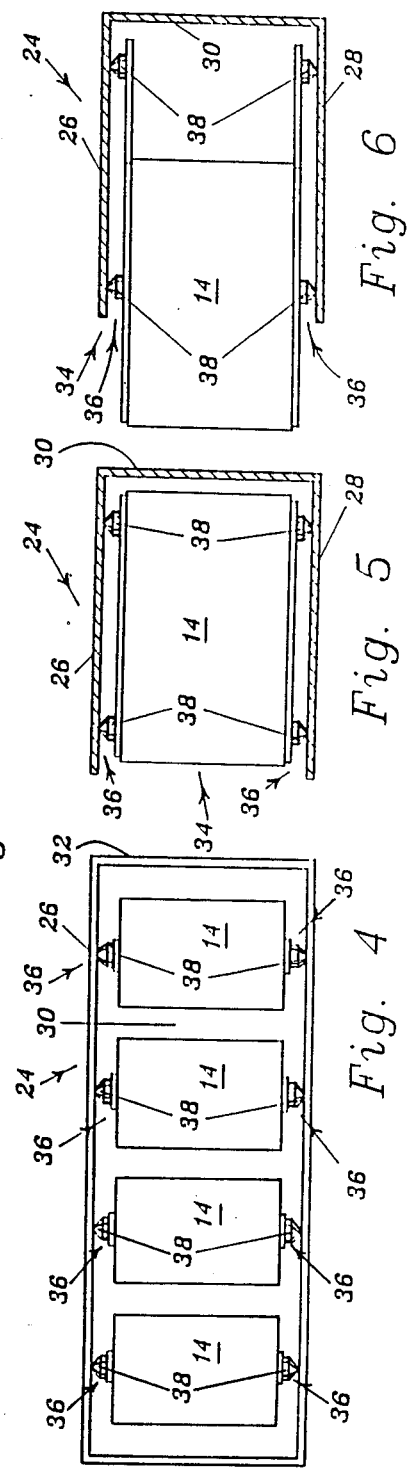

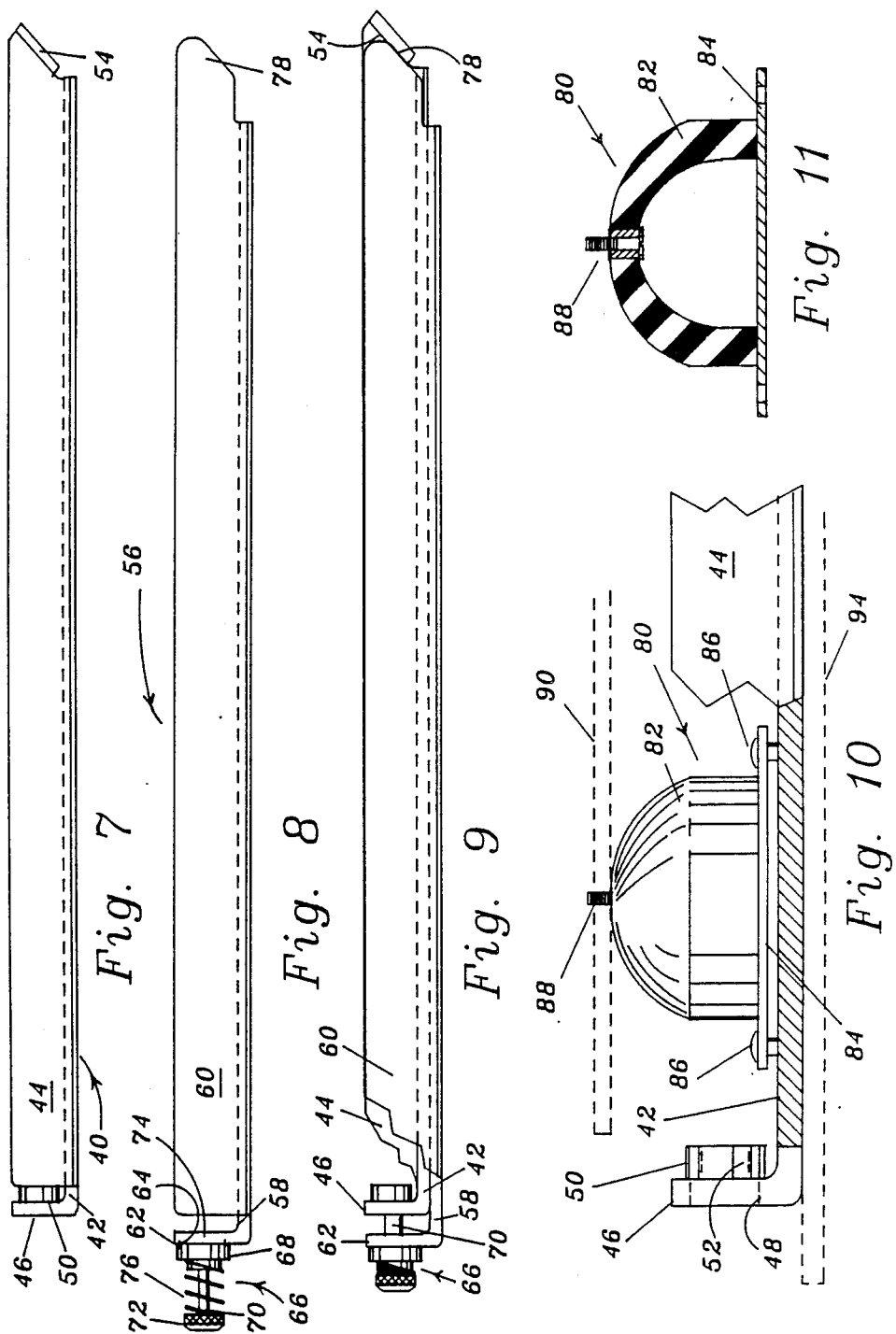

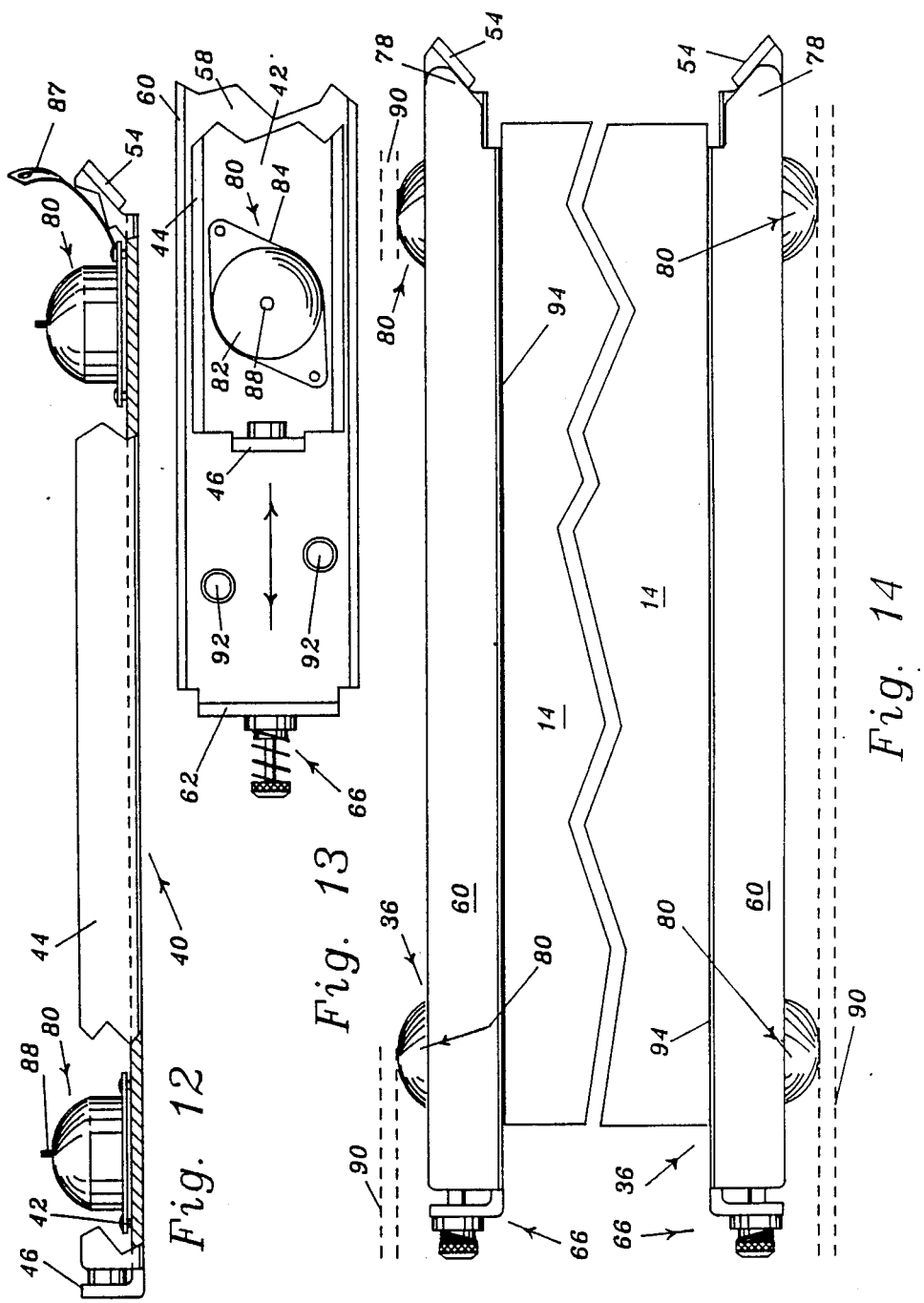

SHOCK AND VIBRATION ISOLATION MOUNTING

BACKGROUND OF THE INVENTION

The present invention relates to shock and vibration mounting systems and, more particularly to a shock and vibration isolation mounting apparatus for releasably mounting a box-like article such as a computer disk drive between two opposed surfaces and comprising two pair of mounting assemblies for attaching to the article and to respective ones of the opposed surfaces wherein one of the pair of mounting assemblies is disposed below the article with the elastomeric members thereof in compression and the other of the pair of mounting assemblies is disposed above the article with the elastomeric members thereof in tension, and wherein, each of the mounting assemblies comprises, a first elongated rigid channel member being U-shaped in cross section and comprising a base separating a pair of parallel spaced sides, the first channel member having a transverse member at one end perpendicular to both the base and the sides, the transverse member having a bore therethrough, the first channel member including means for attaching the first channel member to the disk drive; a second elongated rigid channel member also being U-shaped in cross section and comprising a base separating a pair of parallel spaced sides, the second channel member also having a transverse member at one end perpendicular to both the base and the sides, the transverse member having a threaded bore therethrough, the second channel member being sized to slidably fit within the first channel member; threaded bolt means having a head on one end for passing through the bore of the first channel member and threadedly engaging the threaded bore of the second channel member and pulling the transverse members towards one another, the bolt means being a spring-loaded captive bolt carried by the transverse member of the first channel member; and, first and second elastomeric members carried by the second channel member on the base between the sides and adjacent respective ends, the elastomeric members each including means for attaching the second channel member to the adjacent surface and comprising a captive bolt carried perpendicular to the base; the ends of the first, and second channel members opposite the transverse members including engagable interactive means for drawing the ends together and for holding them tightly together as the threaded bolt means pulls the transverse members towards one another, those means comprising the ends of the sides of the first channel member angling at about 45° back towards the base and the ends of the sides of the second channel member including outward facing tabs angling at about 45° back towards the base so that as the threaded bolt means pulls the transverse members towards one another the angled ends of the first channel member engage respective ones of the tabs of the the second channel member and wedgedly force the bases of the first and second channel members tightly towards one another.

While some portions of a computer are relatively shock insensitive, others can be severely damaged by excessive shock. In particular, mass storage drives, such as disk drives, include read/write heads mounted on the ends of lightweight arms, which can be adjacent the easily damaged magnetic surface of the disks therein at the time a shock wave is transferred into the drive. So-called "crashing" of the heads into the magnetic surface can cause catastrophic and unrepairable damage to the disk.

In some instances, shock and vibration isolation has been provided by using shock casters such as those indicated as 10 on the computer 12 of FIG. 1. With the disk drive 14 hard mounted to the chassis of the computer, any shock or vibration induced into the computer 12 is passed directly into the disk drive 14. Thus, with the prior art system of FIG. 1, any shock to the computer 12 itself and not to the other side of the shock casters 10 is not even affected by the shock casters 10. Moreover, since a given computer system can vary in weight by more than 20%, and because most shock casters are sized to meet the heaviest needs, the shock casters may end up actually amplifying shock and vibration inputs to the computer chassis with the lightest configurations. In some factory environments, shock isolated floors are even installed to isolate larger commercial sized computers.

Even where shock absorbing feet 16 are mounted between the chassis of the computer 12 and the drive 14, or the like, as shown in FIG. 2, there are many problems; not the least of which is the inability to install and remove the drive. For example, one can appreciate that in an installation such as that shown in simplified form in FIG. 2, with shock absorbing feet 16 at each of the corners of the base of the drive 14 for complete support, there must be access from various points in order to install or remove the drive 14. If shock isolation is to be optimized for each drive, the feet 16 must be associated therewith.

FIG. 3 depicts in simplified form the shocks that must be considered in an optimized mounting system. There are front to back forces as indicated by the arrow 18; side to side forces as indicated by the arrow 20; and vertical forces as indicated by the arrow 22.

Wherefore, it is an object of the present invention to provide a manner of shock and vibration mounting a computer disk drive, or the like, to a computer chassis which optimally accounts for all the possible shock and vibration force vectors.

It is another object of the present invention to provide a manner of shock and vibration mounting a computer disk drive, or the like, to a computer chassis which permits changing the characteristics of the mounting to adapt to the weight of different drives.

It is yet another object of the present invention to provide a manner of shock and vibration mounting a computer disk drive, or the like, to a computer chassis which permits the drive to be quickly and easily inserted or removed with access from only one side.

SUMMARY

The forgoing and other objects have been realized by the shock and vibration isolation mounting system of the present invention wherein two pair of mounting assemblies are employed for slidably and releasably attaching to the drive and to respective ones of opposed surfaces between which the drive is mounted so that one of the pair of mounting assemblies is disposed below the drive with its elastomeric members in compression and the other of the pair of mounting assemblies is disposed above the drive with its elastomeric members in tension. To attain the desired one side accessibility, each of the mounting assemblies includes a first elongated rigid channel member being U-shaped in cross section and comprising a base separating a pair of parallel spaced sides, the first channel member having a transverse member at one end perpendicular to both the base and the sides and having a bore therethrough. The first channel member also includes means for attaching the first channel member to the disk drive. There is a second elongated rigid channel member also being U-shaped in cross section and comprising a base separating a pair of parallel spaced sides and also having a transverse member at one end perpendicular to both the base and the sides and having a threaded bore therethrough. The second channel member is sized to slidably fit within the first channel member. There are threaded bolt means having a head on one end for passing through the bore of the first channel member and threadedly engaging the threaded bore of the second channel member and pulling the transverse members towards one another. In the preferred embodiment, the bolt means is a spring-loaded captive bolt carried by the transverse member of the first channel member. First and second elastomeric members are carried by the second channel member on the base between the sides and adjacent respective ends. The elastomeric members each include means for attaching the second channel member to the adjacent surface and comprising a captive bolt carried perpendicular to the base. The ends of the first and second channel members opposite the transverse members include engagable interactive means for drawing the ends together and for holding them tightly together as the threaded bolt means pulls the transverse members towards one another. In the preferred embodiment, those means comprise the ends of the sides of the first channel member angling at about 45° back towards the base and the ends of the sides of the second channel member including outward facing tabs angling at about 45° back towards the base so that as the threaded bolt means pulls the transverse members towards one another the angled ends of the first channel member engage respective ones of the tabs of the second channel member and wedgedly force the bases of the first and second channel members tightly towards one another.

DESCRIPTION OF THE DRAWINGS

FIG. 1 is a perspective view showing one prior art manner of providing shock mounting for a disk drive within a computer.

FIG. 2 is a perspective view showing another prior art manner of shock mounting a disk drive within a computer.

FIG. 3 is a simplified perspective view of a computer disk drive showing the forces that must be taken into consideration in a shock mounting system.

FIG. 4 is a simplified front view of the invention of the present invention in its preferred embodiment used to mount a pair of computer disk drives.

FIG. 5 is a side view of the apparatus of FIG. 4 in the inserted and locked position.

FIG. 6 is a side view of the apparatus of FIG. 4 showing the disk drive in the process of being inserted or removed with access only from the front as is possible with the present invention.

FIG. 7 is a side view of the inner channel member of the present invention.

FIG. 8 is a side view of the outer channel member of the present invention.

FIG. 9 is a partially cutaway side view of the inner and outer channel members in their engaged position.

FIG. 10 is an enlarged partially cutaway view of the inner channel member of the present invention with one of the elastomeric members mounted thereto.

FIG. 11 is a cutaway view through the elastomeric member of FIG. 9.

FIG. 12 is a partially cutaway view of the inner channel member showing the elastomeric members attached thereto adjacent the ends thereof.

FIG. 13 is a top view of the threadedly engaging ends of the inner and outer channel members slidable mated but not connected together as during insertion or removal of the disk drive.

FIG. 14 is a side view of the present invention in its preferred manner of use with the elastomeric members under tension from the top and compression from the bottom.

DESCRIPTION OF THE PREFERRED EMBODIMENT

The present invention and its manner of operation is shown in simplified form in FIGS. 4–6. As shown in FIG. 4, the present invention permits the mounting, insertion and removal of multiple drives with access from only one side. For illustration purposes only, the two drives 14 are shown disposed within a box 24 having an opposed top and bottom 26 and 28, respectively, along with a back 30 and opposed sides 32. The front 34 is shown as being the open side through which installation is affected. Each drive 14 is mounted between two pair of mounting assemblies 36. One pair is connected between the top of the drive 14 and the top 26 of the box 24 while the other is connected between the bottom of the drive 14 and the bottom 28 of the box 24. Each mounting assembly 36 includes an elastomeric member 38. Because of the unique two pair configuration, the upper elastomeric members 38 are in tension while the lower members 38 are in compression. As will be appreciated from the discussion hereinafter, this configuration accounts for all the force vectors of FIG. 3.

As depicted in FIGS. 5 and 6, the mounting assemblies 36 lock together as shown in FIG. 5 to place all the shock and vibration absorption on the elastomeric members 38; and, release to allow the drive 14 and elastomeric members 38 to slide in and out for change of the drive 14 and/or the members 38 to affect optimum isolation. The construction of the mounting assemblies 36 will now be described in greater detail.

The basic part of the present invention is, of course, the mounting assembly 36. For use in mounting a disk drive or something of like size and shape, each mounting assembly 36 has an elongated inner rigid channel member 40 of steel, or the like, as shown in side view in FIG. 7. As will be appreciated by those skilled in the art, in using the present invention to vertically mount an elongated device of some sort, the channel members to be described could be much shorter with only one elastomeric member 38 associated therewith. The inner channel member 40 is generally U-shaped and comprises a base 42 separating a pair of parallel sides 44 perpendicular to the base. A transverse member 46 extends across one end perpendicular to the base 42 and sides 44. There is a centrally located bore 48 through the member 46 concentrically connected to collar 50, which has a threaded bore 52 therein. At the other end of the inner channel member 40, the ends of the sides 44 are bent to form outward facing tabs 54 which angle back towards the base 42 at about a 45° angle. As will be seen shortly, the tabs 54 form one half of means for causing the components to be drawn and held together.

Each mounting assembly 36 also has an elongated outer rigid channel member 56 of steel, or the like, as shown in side view in FIG. 8. The outer channel member 56 is also generally U-shaped and, like the inner member 40, comprises a base 58 separating a pair of parallel sides 60 perpendicular to the base. A transverse member 62 extends across one end perpendicular to the base 58 and sides 60. There is a centrally located bore 64 through the member 62. A spring-loaded bolt assembly 66 is concentrically connected to the bore 64. Bolt assembly 66 is of well known design and comprises a collar 68 press fit into the bore 64 and slidably carrying a shaft 70 having a knurled and slotted head 72, a threaded opposite end 74 adapted to threadedly engage the threaded bore 52, and a bias spring 76 urging the head outward. At the other end of the outer channel member 56, the ends 78 of the sides 60 angle back towards the base 58 at about a 45° angle. As will be seen shortly, the angled ends 78 form the other half of means for causing the components to be drawn and held together.

As shown in FIGS. 9 and 13, the inner and outer channel members 40, 56 slidably fit together with the base 42 of the inner member 40 disposed on the base 58 of the outer member 56 and with sides 44 between sides 60. As the inner member 40 is slid into the outer member 56 with the transverse members 46, 62 in close proximity, the threaded end 74 of the bolt assembly 66 can be pushed into engagement with the threaded bore 52. Thereafter, by turning the head 72, the transverse members 46, 62 can be pulled towards one another. As the transverse members 46, 62 are juxtaposed for engagement of the bolt assembly 66 with the threaded bore 52, the angled ends 78 of the outer member 56 also contact the tabs 54 of the inner member 40. As the transverse members 46, 62 are drawn together, the angled ends 78 tend to ride up the tabs 54 drawing and holding the inner and outer channel members 40, 56 tightly together on that end as well. Thus, by sliding the channel members 40, 56 together and tightening the bolt assembly 66 into the threaded bore 52 at one end, the members 40, 56 are held tightly together along their entire length.

The inner channel member 40 is provided with a pair of elastomeric members 80 disposed adjacent the respective ends thereof as shown in FIGS. 10–13. Each elastomeric member 80 comprises a block 82 of rubber, or the like, as appropriate for the particular application. The manner of construction of the block 82 to achieve shock and vibration damping with particular loads is well known to those skilled in the art and, per se, forms no part of the present invention. In the interest of simplicity and to avoid redundancy, therefore, no further details of the construction and materials of the blocks 82 will be provided herein. Each block 82 is bonded to a metal base plate 84 by which it can be mounted to the base 42 of the inner channel member 40 as with rivets 86. Since the material of the elastomeric members 80 is typically an electrical insulator such as rubber, or the like, it is preferred that a flexible metal grounding strip 87 be fastened to the inner channel member 40 for grounding same. This is conveniently done with the rear rivet 86 as shown in FIG. 12. Each block 82 also carries a captive bolt 88 perpendicular to the base 42, as best seen with reference to FIG. 11, whereby to attach the inner channel member 40 to the top and bottom 26, 28 of the computer chassis, as indicated by the ghosted lines 90. The outer channel member 56 can be provided with chamfered holes 92 therethrough as shown in FIG. 13, integral mounting tabs, or the like, by which the outer channel member 56 can be attached to the disk drive case, indicated by the ghosted lines 94 in FIG. 14, using flat headed screws or bolts (not shown).

While the mounting assemblies of the present invention as hereinbefore described could be used as a base upon which to sit a disk drive, or the like; or, could be used to suspend some device from above to achieve some of the benefits thereof, the preferred manner of use is shown in FIG. 14 wherein a disk drive 14 is disposed between two pair of mounting assemblies 36 in the manner of the simplified drawings of FIGS. 4–6. In this arrangement, the upper elastomeric members 80 are in tension while the lower elastomeric members 80 are in compression. This provides for optimum isolation from all the various shock and vibration force vectors as described previously with respect to FIG. 3. As required to allow isolation to be associated with the device (and therefore changeable) the elastomeric members 80 attached to the computer chassis can easily be changed by backing out the captive bolts 88. With access from only one side, the disk drive 14 with the outer channel members 56 attached thereto can be slid onto the inner channel members 40, as previously described and as indicated in FIG. 13, and a screwdriver used to engage the head 72 of the bolt assembly 66 to tighten (or untighten) it. Removal is, of course, just as easy and merely a reverse of the insertion process.

Thus, it can be seen from the foregoing description that the present invention has truly met its stated objectives by providing a method and apparatus for mounting a computer disk drive, or the like, which provides optimum isolation from shock and vibration while allowing insertion and/or removal with full access from only one side.

Wherefore, having thus described our invention, we claim:

1. Shock and vibration isolation mounting apparatus for releasably connecting two articles together comprising:
   (a) a first rigid channel member being U-shaped in cross section and comprising a base separating a pair of parallel spaced sides, said first channel member having a transverse member at one end perpendicular to both said base and said sides, said transverse member having a bore therethrough, said first channel member including means for attaching said first channel member to the surface of one of the articles to be connected;
   (b) a second rigid channel member also being U-shaped in cross section and comprising a base separating a pair of parallel spaced sides, said second channel member also having a transverse member at one end perpendicular to both said base and said sides, said transverse member having a threaded bore therethrough, said second channel member being sized to slidably fit within said first channel member;
   (c) threaded bolt means having a head on one end for passing through said bore of said first channel member and threadedly engaging said threaded bore of said second channel member and pulling said transverse members towards one another; and,
   (d) a first elastomeric member carried by said second channel member on said base between said sides, said elastomeric member including means for attaching said second channel member to the surface of the other of the articles to be connected; and wherein, (e) the ends of said first and second channel members opposite said transverse members include engagable interactive means for drawing said ends together and for holding them tightly together as said threaded bolt means pulls said transverse members towards one another.

2. The shock and vibration isolation mounting apparatus of claim 1 wherein said engagable interactive means for drawing said ends together and for holding them tightly together as said threaded bolt means pulls said transverse members towards one another comprises;

(a) the ends of the sides of said first channel member angling at about 45° back towards said base; and, (b) the ends of the sides of said second channel member including outward facing tabs angling at about 45° back towards said base so that as said threaded bolt means pulls said transverse members towards one another said angled ends of said first channel member engage respective ones of said tabs of said said second channel member and wedgedly force said bases of said first and second channel members tightly towards one another.

3. The shock and vibration isolation mounting apparatus of claim 1 wherein said first and second channel members are elongated and additionally comprising:

a second elastomeric member carried by said second channel member on said base between said sides, said second elastomeric member also including means for attaching said second channel member to the surface of the other of the articles to be connected, said first and second elastomeric members being disposed at opposite ends of said second channel member.

4. The shock and vibration isolation mounting apparatus of claim 1 wherein said means for attaching said second channel member to the surface of the other of the articles to be connected comprises:

a captive bolt carried by said elastomeric means perpendicular to said base.

5. The shock and vibration isolation mounting apparatus of claim 1 wherein:

said threaded bolt means having a head on one end for passing through said bore of said first channel member and threadedly engaging said threaded bore of said second channel member and pull said transverse members towards one another is a spring-loaded captive bolt carried by said transverse member of said first channel member.

6. Shock and vibration isolation mounting apparatus for releasably mounting an article to a surface comprising a pair of mounting assemblies for attaching to the article and the surface, each of said mounting assemblies comprising:

(a) a first elongated rigid channel member being U-shaped in cross section and comprising a base separating a pair of parallel spaced sides, said first channel member having a transverse member at one end perpendicular to both said base and said sides, said transverse member having a bore therethrough, said first channel member including means for attaching said first channel member to the article;

(b) a second elongated rigid channel member also being U-shaped in cross section and comprising a base separating a pair of parallel spaced sides, said second channel member also having a transverse member at one end perpendicular to both said base and said sides, said transverse member having a threaded bore therethrough, said second channel member being sized to slidably fit within said first channel member;

(c) threaded bolt means having a head on one end for passing through said bore of said first channel member and threadedly engaging said threaded bore of said second channel member and pull said transverse members towards one another; and, (d) a first elastomeric member carried by said second channel member on said base between said sides, said elastomeric member including means for attaching said second channel member to the surface; and wherein, (e) a second elastomeric member carried by said second channel member on said base between said sides, said second elastomeric member also including means for attaching said second channel member to the surface, said first and second elastomeric members being disposed at opposite ends of said second channel member.

(f) the ends of said first and second channel members opposite said transverse members include engagable interactive means for drawing said ends together and for holding them tightly together as said threaded bolt means pulls said transverse members towards one another.

7. The shock and vibration isolation mounting apparatus of claim 6 wherein said engagable interactive means for drawing said ends together and for holding them tightly together as said threaded bolt means pulls said transverse members towards one another comprises:

(a) the ends of the sides of said first channel member angling at about 45° back towards said base; and, (b) the ends of the sides of said second channel member including outward facing tabs angling at about 45° back towards said base so that as said threaded bolt means pulls said transverse members towards one another said angled ends of said first channel member engage respective ones of said tabs of said said second channel member and wedgedly force said bases of said first and second channel members tightly towards one another.

8. The shock and vibration isolation mounting apparatus of claim 6 wherein said means for attaching said second channel member to the surface comprises:

a captive bolt carried by said elastomeric means perpendicular to said base.

9. The shock and vibration isolation mounting apparatus of claim 6 wherein:

said threaded bolt means having a head on one end for passing through said bore of said first channel member and threadedly engaging said threaded bore of said second channel member and pull said transverse members towards one another is a spring-loaded captive bolt carried by said transverse member of said first channel member.

10. The shock and vibration isolation mounting apparatus of claim 6 wherein:

(a) one of said pair of mounting assemblies is disposed below the article with the elastomeric members thereof in compression; and, (b) the other of said pair of mounting assemblies is disposed above the article with the elastomeric members thereof in tension.

11. The shock and vibration isolation mounting apparatus of claim 6 wherein:
said pair of mounting assemblies is disposed below the article with the elastomeric members thereof in compression.

12. The shock and vibration isolation mounting apparatus of claim 6 wherein:
said pair of mounting assemblies is disposed above the article with the elastomeric members thereof in tension.

13. Shock and vibration isolation mounting apparatus for releasably mounting an article between two surfaces comprising:
two pair of mounting assemblies for attaching to the article and the surface wherein one of said pair of mounting assemblies is disposed below the article with elastomeric members thereon in compression and the other of said pair of mounting assemblies is disposed above the article with elastomeric members thereon in tension; and wherein each of said mounting assemblies comprises:
(a) a first elongated rigid channel member being U-shaped in cross section and comprising a base separating a pair of parallel spaced sides, said first channel member having a transverse member at one end perpendicular to both said base and said sides, said transverse member having a bore therethrough, said first channel member including means for attaching said first channel member to the article;
(b) a second elongated rigid channel member also being U-shaped in cross section and comprising a base separating a pair of parallel spaced sides, said second channel member also having a transverse member at one end perpendicular to both said base and said sides, said transverse member having a threaded bore therethrough, said second channel member being sized to slidably fit within said first channel member;
(c) threaded bolt means having a head on one end for passing through said bore of said first channel member and threadedly engaging said threaded bore of said second channel member and pull said transverse members towards one another; and,
(d) a first elastomeric member carried by said second channel member on said base between said sides, said elastomeric member including means for attaching said second channel member to the adjacent surface; and wherein,
(e) a second elastomeric member carried by said second channel member on said base between said sides, said second elastomeric member also including means for attaching said second channel member to the adjacent surface, said first and second elastomeric members being disposed at opposite ends of said second channel member.
(f) the ends of said first and second channel members opposite said transverse members include engagable interactive means for drawing said ends together and for holding them tightly together as said threaded bolt means pulls said transverse members towards one another.

14. The shock and vibration isolation mounting apparatus of claim 13 wherein said engagable interactive means for drawing said ends together and for holding them tightly together as said threaded bolt means pulls said transverse members towards one another comprises:
(a) the ends of the sides of said first channel member angling at about 45° back towards said base; and,
(b) the ends of the sides of said second channel member including outward facing tabs angling at about 45° back towards said base so that as said threaded bolt means pulls said transverse members towards one another said angled ends of said first channel member engage respective ones of said tabs of said said second channel member and wedgedly force said bases of said first and second channel members tightly towards one another.

15. The shock and vibration isolation mounting apparatus of claim 13 wherein said means for attaching said second channel member to the surface comprises:
a captive bolt carried by said elastomeric means perpendicular to said base.

16. The shock and vibration isolation mounting apparatus of claim 13 wherein:
said threaded bolt means having a head on one end for passing through said bore of said first channel member and threadedly engaging said threaded bore of said second channel member and pull said transverse members towards one another is a spring-loaded captive bolt carried by said transverse member of said first channel member.

17. Shock and vibration isolation mounting apparatus for releasably mounting a box-like article between two opposed surfaces comprising:
two pair of mounting assemblies for attaching to the article and to respective ones of the opposed surfaces wherein one of said pair of mounting assemblies is disposed below the article with elastomeric members thereon in compression and the other of said pair of mounting assemblies is disposed above the article with elastomeric members thereon in tension; and wherein each of said mounting assemblies comprises:
(a) a first elongated rigid channel member being U-shaped in cross section and comprising a base separating a pair of parallel spaced sides, said first channel member having a transverse member at one end perpendicular to both said base and said sides, said transverse member having a bore therethrough, said first channel member including means for attaching said first channel member to the article;
(b) a second elongated rigid channel member also being U-shaped in cross section and comprising a base separating a pair of parallel spaced sides, said second channel member also having a transverse member at one end perpendicular to both said base and said sides, said transverse member having a threaded bore therethrough, said second channel member being sized to slidably fit within said first channel member;
(c) threaded bolt means having a head on one end for passing through said bore of said first channel member and threadedly engaging said threaded bore of said second channel member and pull said transverse members towards one another, said bolt means being a spring-loaded captive bolt carried by said transverse member of said first channel member;
(d) a first elastomeric member carried by said second channel member on said base between said sides, said elastomeric member including means for attaching said second channel member to the one of the opposed surfaces and comprising a captive bolt carried by said elastomeric means perpendicular to said base; and, (e) a second elastomeric member carried by said second channel member on said base between said sides, said second elastomeric member also including means for attaching said second channel member to said one of the opposed surfaces and comprising a captive bolt carried by said elastomeric means perpendicular to said base, said first and second elastomeric members being disposed at opposite ends of said second channel member; and wherein, (f) the ends of said first and second channel members opposite said transverse members include engagable interactive means for drawing said ends together and for holding them tightly together as said threaded bolt means pulls said transverse members towards one another, said means comprising the ends of the sides of said first channel member angling at about 45° back towards said base and the ends of the sides of said second channel member including outward facing tabs angling at about 45° back towards said base so that as said threaded bolt means pulls said transverse members towards one another said angled ends of said first channel member engage respective ones of said tabs of said said second channel member and wedgedly force said bases of said first and second channel members tightly towards one another.

* * * * *